US009001846B2

(12) United States Patent
Lin et al.

(10) Patent No.: US 9,001,846 B2
(45) Date of Patent: Apr. 7, 2015

(54) PHYSICAL LAYER DEVICE WITH DUAL MEDIUM ACCESS CONTROLLER PATH

(75) Inventors: Meg Lin, Saratoga, CA (US); Daniel Tai, Santa Clara, CA (US)

(73) Assignee: Broadcom Corporation, Irvine, CA (US)

(*) Notice: Subject to any disclaimer, the term of this patent is extended or adjusted under 35 U.S.C. 154(b) by 1363 days.

(21) Appl. No.: 12/550,004

(22) Filed: Aug. 28, 2009

(65) Prior Publication Data
US 2010/0312910 A1 Dec. 9, 2010

Related U.S. Application Data

(60) Provisional application No. 61/185,447, filed on Jun. 9, 2009.

(51) Int. Cl.
*H04J 3/24* (2006.01)
*H04L 29/06* (2006.01)
*H04L 9/00* (2006.01)
*H04L 9/06* (2006.01)

(52) U.S. Cl.
CPC ............ *H04L 63/0236* (2013.01); *H04L 9/004* (2013.01); *H04L 9/06* (2013.01); *H04L 63/0428* (2013.01); *H04L 2209/125* (2013.01); *H04L 2209/60* (2013.01)

(58) Field of Classification Search
USPC .......... 370/389–427, 535–545, 474; 709/250, 709/237, 238
See application file for complete search history.

(56) References Cited

U.S. PATENT DOCUMENTS

| 6,272,552 | B1* | 8/2001 | Melvin et al. ................. 709/250 |
| 7,912,045 | B2* | 3/2011 | Page ............................. 370/389 |
| 7,925,913 | B1* | 4/2011 | Vijayaraghavan et al. ... 713/500 |
| 2006/0239300 | A1* | 10/2006 | Hannel et al. ................. 370/503 |

OTHER PUBLICATIONS

Barrass, Hugh et al., "Proposal for Priority Based Flow Control", Task Group : Data Center Bridging, Revision : bb-pelissier-pfc-proposal-0308-v2 Mar. 27, 2008, 9 pages. document available at: http://www.ieee802.org/1/files/public/docs2008/bb-pelissier-pfc-proposal-0308.pdf.

(Continued)

*Primary Examiner* — Iqbal Zaidi
(74) *Attorney, Agent, or Firm* — McDermott Will & Emery LLP (57) ABSTRACT

According to one example embodiment, an apparatus may include a media-side physical layer (PHY) block configured to receive a received signal via at least one medium, decode the received signal into data, and send the data to a media-side medium access control (MAC) block, the media-side MAC block configured to receive the data from the media-side PHY layer block, determine a time of receipt of the data, prevent a system-side MAC block from forwarding the data until a predetermined delay after the time of receipt, perform MAC functions on the data, and send the data to the system-side MAC block, the system-side MAC block configured to receive the data and the control time from the media-side MAC block and send the data to a system-side PHY block after the predetermined delay based on signals received from the media-side MAC block, and the system-side PHY block configured to receive the data from the system-side MAC block, encode the data into a transmitted signal, and transmit the transmitted signal to a computing system.

17 Claims, 7 Drawing Sheets

(56) References Cited

OTHER PUBLICATIONS

"1588—IEEE Standard for a Precision Clock Synchronization Protocol for Networked Measurement and Control Systems", IEEE Instrumentation and Measurement Society, Jul. 24, 2008, 289 pages.
"802.1AE—IEEE Standard for Local and Metropolitan Area Networks: Media Access Control (MAC) Security", IEEE Computer Society, Aug. 18, 2006, 154 pages.

* cited by examiner

“Physical Layer Device With Dual Medium Access Controller Path,” the disclosure of which is hereby incorporated by reference.

PHYSICAL LAYER DEVICE WITH DUAL MEDIUM ACCESS CONTROLLER PATH

PRIORITY CLAIM

This Application claims the benefit of priority based on U.S. Provisional Patent Application No. 61/185,447, filed on Jun. 9, 2009, entitled, "Physical Layer Device With Dual Medium Access Controller Path," the disclosure of which is hereby incorporated by reference.

TECHNICAL FIELD

This description relates to networking.

BACKGROUND

Devices with physical layer functions may receive data, change the coding scheme of the data, and retransmit the data with the new coding scheme. The physical layer functions may require a constant delay between data received and data transmitted by the device. The requirement of the constant delay may impose difficulties in implementing medium access control (MAC) functions in the device.

SUMMARY

The details of one or more implementations are set forth in the accompanying drawings and the description below. Other features will be apparent from the description and drawings, and from the claims.

DETAILED DESCRIPTION

Figure 1:
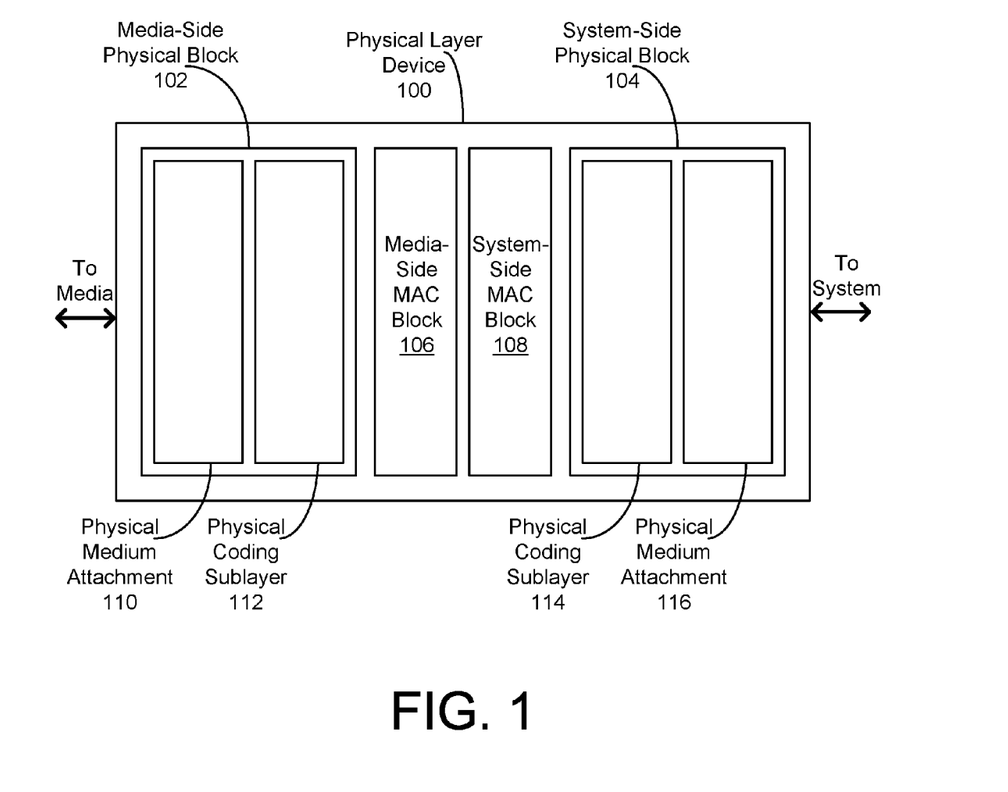
FIG. 1 is a block diagram of an apparatus according to an example embodiment.

FIG. 1 is a block diagram of an apparatus according to an example embodiment. The apparatus may include, for example, a physical (PHY) layer device 100. The PHY layer device 100 may send and receive signals and/or data. The PHY layer device 100 may, for example, receive signals or data according to one encoding or communication scheme, and send the data as signals according to another encoding or communication scheme. The PHY layer device 100 may, for example, receive the signals via at least one medium, decode the signals into data based on a first encoding scheme, encode the data into transmitted signals based on a second encoding scheme, and transmit the transmitted signals.

In an example embodiment, the PHY layer device 100 may be coupled to a line or medium/media at one side, and to a system, such as a switch, router, packet processor, or MAC aggregator, at another side. In the example shown in FIG. 1, the PHY layer device 100 may include a media-side physical (PHY) block 102 coupled to the line or medium/media at one side, and a system-side PHY block 104 coupled to the system, such as the switch, router, packet processor, or MAC aggregator, at the other side.

The media-side PHY block 102 may receive a received signal, and/or transmit a transmitted signal, via at least one medium, such as a twisted pair, coaxial cable, optical fiber, or air interface, according to various example embodiments. The media-side PHY block 102 may also decode the received signal into data, and/or encode data into a transmitted signal. The media-side PHY block 102 may also send the data to a media-side MAC block 106, and/or receive data from the media-side MAC block 106. The system-side PHY block 104 may exhibit similar behavior with respect to the system and the system-side MAC block 108, according to an example embodiment.

In an example embodiment, the media-side PHY block 102 may include a media-side physical medium attachment (PMA) block 110. The media-side PMA block 110 may receive the received signal (and/or transmit the transmitted signal) via the media, and send the received signal (and/or receive the transmitted signal) to a media-side physical coding sublayer (PCS) block 112. The media-side PHY block 102 may also include the media-side PCS block 112 with a digital interface to the media-side PMA block 110. The media-side PCS block 112 may be programmable for different coding schemes, and may decode the received signal into data and send the data to a media-side MAC block 106, and/or receive data from the system-side MAC block 106, encode the data into the transmitted signal, and send the transmitted signal to the media-side PMA block 110. The system-side PHY block 104 may also include a system-side PCS block 114 and/or a system-side PMA block 116, which may perform functions similar to those described in this paragraph with respect to the media-side PCS block 112 and/or media-side PMA block 110, according to an example embodiment.

The PHY layer device 100 may also include the media-side MAC block 106. The media-side MAC block 106 may receive the data from the media-side physical layer block 102 (and/or send data to the media-side physical layer block 102). In response to receiving the data from the media-side physical block 102, the media-side MAC block 106 may determine a time of receipt of the data. The media-side MAC block 106 may also send a control time to a system-side MAC block 108. The control time may be based on the time of receipt, and may be the time of receipt itself, or a delayed time after the time of receipt, such as a time at which the system-side MAC block 108 should send the data to the system-side physical block 104. The media-side MAC block 106 may also perform MAC functions on the data, such as carrier sense multiple access collision detection (CSMA-CD) and/or flow control functions, such as link-based flow control functions and/or priority-based flow control functions, security functions such as encryption/decryption, link fault signaling, and/or power control, according to example embodiments. The media-side MAC block 106 may also send the data to the system-side MAC block 108.

In an example embodiment, the media-side MAC block 106 may include a priority flow controller (PFC), which may determine which of the data include flow control information.

In this example, the media-side MAC block 106 may send the data which include flow control information to the system-side MAC block 108 before sending data which do not include flow control information to the system-side MAC block 108.

In an example embodiment, the media-side MAC block may include a link fault detector, which may recognize a media-side link fault signal received from the media-side PHY block 102. In response to recognizing the media-side link fault signal, the media-side MAC block 106 may assert a MAC-level link fault signal to the system-side MAC block 108. In this example, the system-side MAC block 108 may include a link fault generator. The link fault generator may generate and send a system-side link fault signal to the system-side PHY block 104 in response to receiving the MAC-level link fault signal.

When the media-side MAC block 106 receives data from the system-side MAC block 108, the media-side MAC block 106 may send the data to the media-side PHY block at a predetermined delay after the time of receipt by the system-side MAC block 108 based on the control time, and/or store the data in a buffer until the predetermined delay after the time of receipt, according to example embodiments.

The PHY layer device 100 may also include the system-side MAC block 108. The system-side MAC block 108 may mirror the functions of the media-side MAC block 106, according to an example embodiment.

Figure 2:
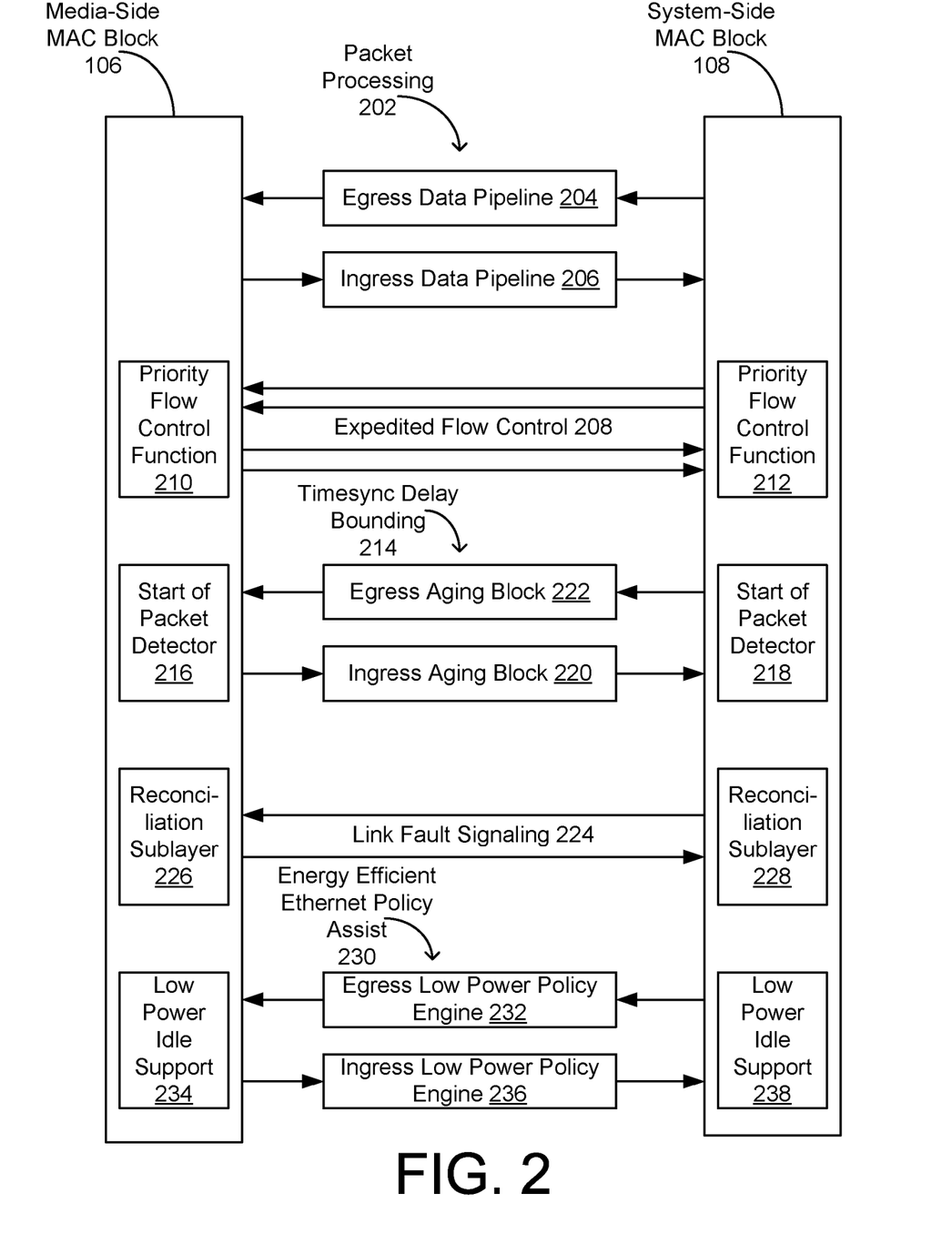
FIG. 2 is a block diagram showing data and control paths between two medium access control (MAC) blocks according to an example embodiment.

FIG. 2 is a block diagram showing data and control paths between two MAC blocks (such as the media-side MAC block 106 and the system-side MAC block 108) according to an example embodiment. In this example, the interface between the media-side MAC block 106 and the system-side MAC block 108 may include a packet processing path 202. The packet processing path 202 may enable, for example, level 2 (such as Ethernet) packet processing, and may include encryption and/or decryption of data. The packet processing path 202 may include an egress data pipeline 204, which may process data from the system to the media or line, and/or an ingress data pipeline 206, which may process data from the media or line to the system. Either or both of the egress data pipeline 204 and ingress data pipeline 206 may include queues or buffers for storing the data for transfer at the predetermined time based on the time of receipt of the data.

Figure 3:
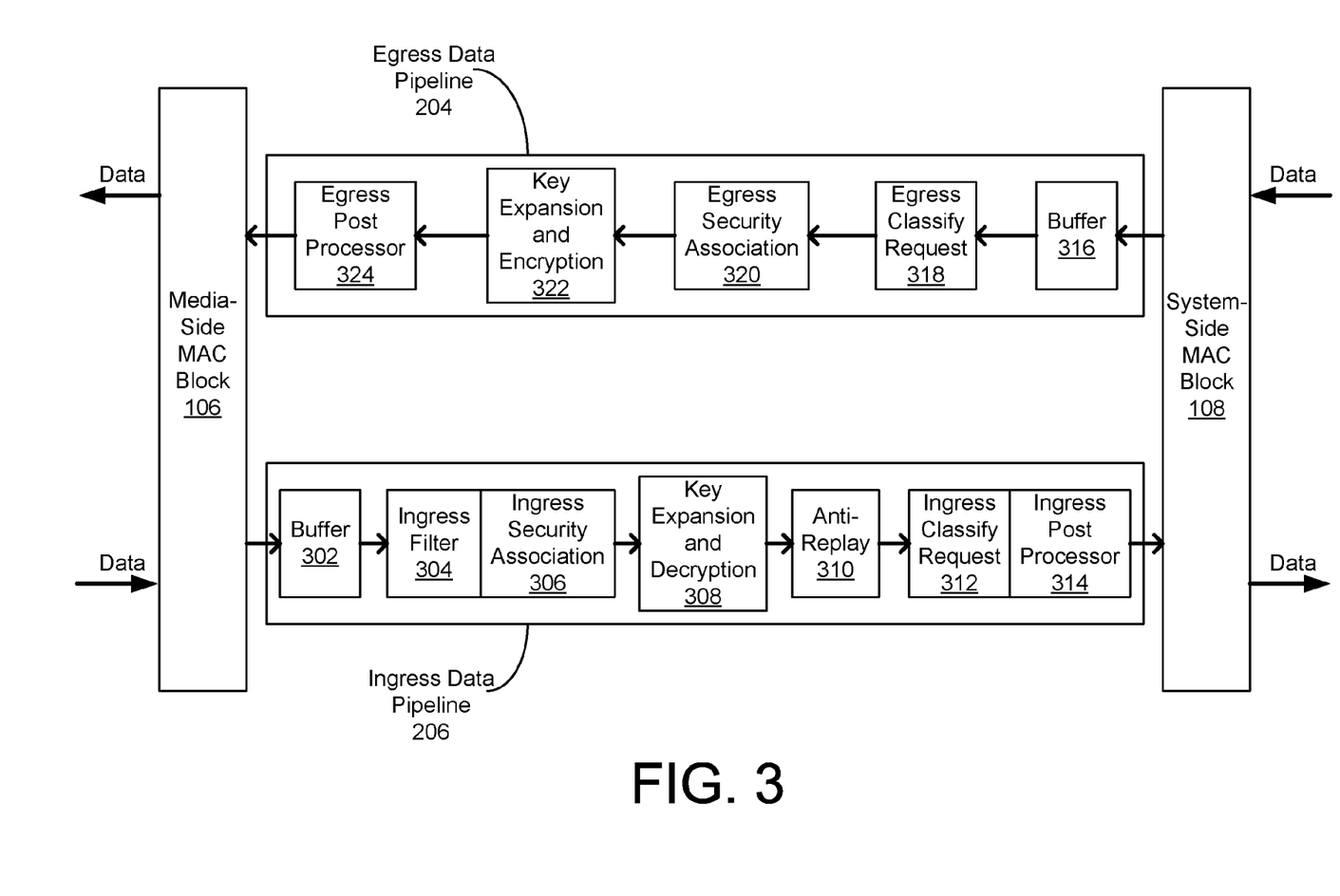
FIG. 3 is a block diagram showing data pipelines between the two MAC blocks according to an example embodiment.

FIG. 3 is a block diagram showing data pipelines, such as the egress data pipeline 204 and the ingress data pipeline 206, between the two MAC blocks, such as the media-side MAC block 106 and the system-side MAC block 108, according to an example embodiment. The egress data pipeline 204 may receive packets from the system-side MAC block 108 and pass the packets to the media-side MAC block 106; the ingress data pipeline 206 may receive packets from the media-side MAC block 106 and pass the packets to the system-side MAC block 108. The media-side MAC block 106 and the system-side MAC block 108 may perform link-based and/or priority-based flow control functions, according to example embodiments. The MAC blocks 106, 108 may receive packets from their respective PHY blocks 102, 104 as fully recovered datagrams, according to an example embodiment. The MAC blocks 106, 108 may serve as first in-first out (FIFO) interfaces to their respective PHY blocks 102, 104, and may allow line rate reception and transmission of packets. The MAC blocks 106, 108 may allow for temporary backpressure and burstiness.

The ingress data pipeline 302 may include a buffer 302. The buffer 302, which may have a memory capacity of 22 kilobytes according to an example embodiment, may store data or packets received from the media-side MAC block 106 for processing through the ingress data pipeline 206.

The ingress data pipeline 206 may also include an ingress filter 304. The ingress filter 304 may determine whether the ingress data pipeline 206 should process particular data or packets. The ingress filter 304 may, for example, examine fields of packets to determine whether the packets should be processed and/or encrypted. If the ingress filter 304 determines that the packets need not be encrypted, then the packets may bypass security, such as by bypassing an ingress security association block 306.

The ingress data pipeline 206 may also include the ingress security association block 306. The ingress security association block 306 may look up a security key for the data or packets. The ingress security association block 306 may provide the security key to a key expansion and decryption block 308.

The ingress data pipeline 206 may also include the key expansion and decryption block 308. The key expansion and decryption block 308 may include a cipher, and may expand and/or decrypt the data or packets. The key expansion and decryption block 308 may expand and/or decrypt the data or packets using, for example, the security key provided by the ingress security association block 306.

The ingress data pipeline 206 may also include an anti-replay block 310. The anti-replay block 310 may confirm that a packet is the expected packet, such as by checking a sequence number. The anti-replay block 310 may allow some out-of-order packets to be processed, such as by maintaining a sliding window of acceptable out-of-order packets, according to an example embodiment.

The ingress data pipeline 206 may also include an ingress classify request block 312. The ingress classify request block 312 may determine whether packets should be dropped and/or redirected. The ingress classify request block 312 may determine whether to drop, process, or redirect packets based, for example, on an out of order indication from the anti-replay block 310, and/or based on examining keys in the packets and matching the keys to rules or actions. The ingress classify request block 312 may provide error indications for the packets, such as by adding a pad with an error indication to the packets, according to an example embodiment.

The ingress data pipeline 206 may also include an ingress post processor 314. The ingress post processor 314 may drop, forward, or redirect packets, based, for example, on indications or signals received from the ingress classify request block 312. The ingress post processor 314 may forward packets to the system-side MAC block 108, according to an example embodiment.

The egress data pipeline 204 may include a buffer 316. The buffer 316, which may have a memory capacity of 22 kilobytes according to an example embodiment, may store data or packets received from the system-side MAC block 108 for processing through the egress pipeline 204.

The egress data pipeline 204 may also include an egress classify request block 318. The egress classify request block 318 may determine a security key for encrypting the packet, and/or may determine whether to encrypt, forward, or drop the packet. The egress classify request block 318 may make either or both of these determinations based, for example, on performing a lookup based on fields included in the packet.

The egress data pipeline 204 may also include an egress security association block 320. The egress security association block 320 may retrieve the security key, and/or may provide the security key to a key expansion and encryption block 322.

The egress data pipeline 204 may also include the key expansion and encryption block 322. The key expansion and encryption block 322 may perform encryption on, and/or expansion of, the data or packet, either or both of which may be based on the security key.

The egress data pipeline 204 may also include an egress post processor 324. The egress post processor 324 may forward the packet to the media-side MAC block 106, and may, for example, ensure that a length of the packet does not exceed a maximum transmission length or packet size, authenticate the packet by inserting an ICV field into the packet, and/or mark a secure path by adding a SecPath field to a beginning in the packet.

Returning to FIG. 2, the PHY layer device 100 may perform expedited flow control 208 operations. Expedited flow control 208 may include sending certain priority packets, such as control packets, before other packets. The media-side MAC block 106 may include a priority (or class-based) flow control function 210, such as a flow control function according to IEEE 802.1BB, which determines when to send priority packets to the system-side MAC block 108, and which sends the priority packets to the system-side MAC block 108. The system-side MAC block 108 may also include a priority flow control function 212, which sends flow control messages and determines when to send priority packets to the media-side MAC block 106, and which sends the priority packets to the media-side MAC block 106. According to an example embodiment, the priority flow control function 212 may use queues, such as the buffers 302, 316, in the data pipelines 206, 204, to store packets and/or flow control messages.

Figure 4:
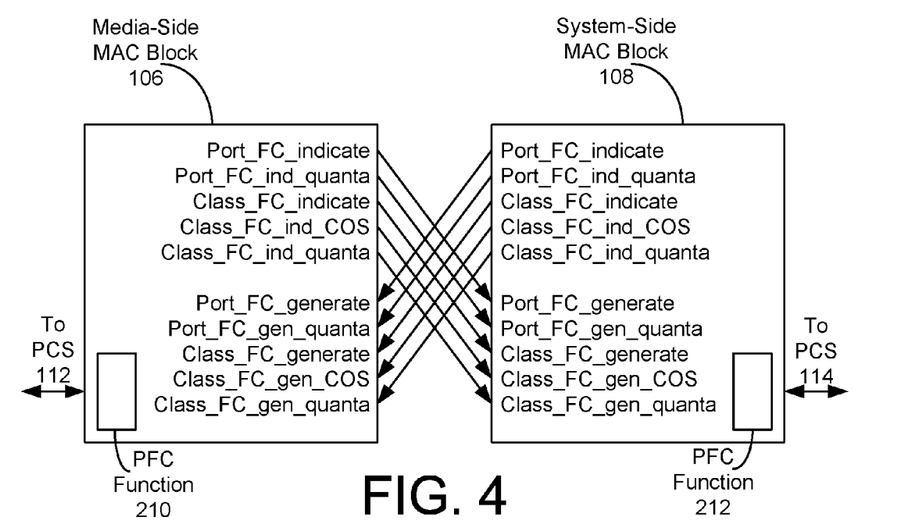
FIG. 4 is a block diagram showing flow control paths between the two MAC blocks according to an example embodiment.

FIG. 4 is a block diagram showing flow control paths between the two MAC blocks (such as the media-side MAC block 106 and the system-side MAC block 108) according to an example embodiment. Upon receipt of a packet, the MAC block 106, 108 which receives the packet may parse the packet into fields to determine whether the packet is a control packet. Or, the MAC blocks 106, 108 may include native pins to indicate reception of flow control frames.

In the example shown in FIG. 4, each MAC block 106, 108 may include flow control indicate pins and flow control generate pins. The flow control indicate pins may indicate reception of flow control frames, and may assert signals to the flow control generate pins of the opposite MAC block 106, 108. Thus, FLOW_CONTROL_INDICATE of one MAC block 106, 108 may directly control FLOW_CONTROL_GENERATE of the other MAC block 106, 108, and vice versa, according to an example embodiment. Upon determining that one of its flow control generate pins has been asserted, either of the MAC blocks 106, 108 may generate a corresponding flow control frame for forwarding to its respective PHY block 102, 104, according to an example embodiment. These connections between the MAC blocks 106, 108 may allow flow control packets to bypass any buffer for normal packets, and be expedited for further processing. This may allow the PHY layer device 100 to implement per-class flow control standards.

Returning to FIG. 2, the PHY layer device 100 may engage in timesync delay bounding 214. Flow control functions of MAC blocks 106, 108, such as encryption, decryption, medium access control, and/or flow control, may cause different packets to have different delays or latencies when processed by a device with MAC functions. However, time-sensitive applications, such as audio or video applications, may require a constant delay for packets being processed by the PHY layer device 100. The timesync delay bounding 214 may guarantee a time at which the MAC blocks 106, 108 will forward packets to their respective PHY blocks 102, 104. The timesync delay bounding 214 may, for example, guarantee that a receiving MAC block 106, 108 forwards a packet to its respective PHY block 102, 104 after a predetermined delay after receipt of the packet by the sending MAC block 106, 108. The predetermined delay may, in an example embodiment, be five-hundred microseconds (500 μs).

The PHY layer device 100 may thereby guarantee a fixed latency or fixed delay for packets traveling through the PHY layer device 100. The delay may be programmable to accommodate different types of packet processing paths, according to an example embodiment. The fixed latency or delay of the MAC blocks 106, 108 may make the MAC blocks 106, 108 transparent to other devices, and allow the PHY layer device 100 to appear to function as a PHY layer device without MAC functions, despite the encryption and/or flow control operations performed by the PHY layer device 100. This fixed latency or delay through the MAC blocks 106, 108 may allow packets to have constant latencies through the PHY layer device 100, and through a network of which the PHY layer device is a component.

In an example embodiment, the media-side MAC block 106 may include a start of packet detector 216. The start of packet detector 216 may detect a time of receipt of a packet by the media-side MAC block 106. The start of packet detector 216 may send the time of receipt to the system-side MAC block 108 via an ingress aging block 220, or may add the predetermined delay to the time of receipt and send the delayed time to the system-side MAC block via the ingress aging block 220, or may include control means for preventing the system-side MAC block 108 from forwarding the packet until after the predetermined delay, according to example embodiments.

The system-side MAC block 108 may also include a start of packet detector 218. The start of packet detector 218 may detect a time of receipt of a packet by the system-side MAC block 108. The start of packet detector 218 may send the time of receipt to the media-side MAC block 106 via the egress aging block 222, or may add the predetermined delay to the time of receipt and send the delayed time to the media-side MAC block 106 via the egress aging block 222, or may include control means for preventing the media-side MAC block 106 from forwarding the packet until after the predetermined delay, according to example embodiments.

Figure 5:
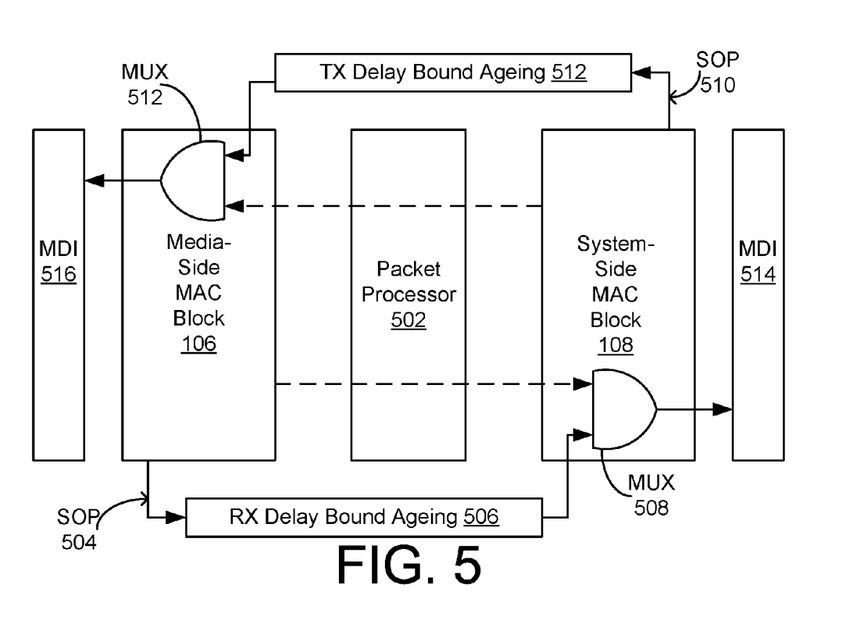
FIG. 5 is a block diagram showing timesync delay bounding between the two MAC blocks according to an example embodiment.

FIG. 5 is a block diagram showing timesync delay bounding between the two MAC blocks (such as the media-side MAC block 106 and the system-side MAC block 108) according to an example embodiment. One of the MAC blocks, such as the media-side MAC block 106, may receive a packet from its respective PHY block, such as the media-side PHY block 102. The media-side MAC block 106 may forward the packet to the system-side MAC block 108 via a packet processor 502. The packet processor 502 may store the packet so that the packet will be available to the system-side MAC block 108 at the time based on the time of receipt of the packet and the predetermined delay.

The media-side MAC block 106 may also determine a time of receipt of the packet or start of packet (SOP) time. The media-side MAC block 106 may provide an SOP_INDICATE signal 504, which may indicate the SOP time, to an RX delay bound ageing block 506. The RX delay bound ageing block 506 may correspond to the ingress ageing block 220 shown in FIG. 2. The RX delay bound ageing block 506 may control whether and/or when the system-side MAC block 108 forwards the packet(s) received from the media-side MAC block 106 via the packet processor 502. The RX delay bound ageing block 506 may serve as a control path for determining when packets may be forwarded by a receiving MAC block 106, 108. The RX delay bound ageing block 506 may, for example, control the forwarding based on the SOP_INDICATE signal received from the media-side MAC block 106. In an example embodiment, the RX delay bound ageing block 506 may include a chain of flip-flops with an aggregate delay equal to the predetermined delay, causing the RX delay bound ageing block 506 to provide a control signal to allow forwarding of the packet after the predetermined delay.

In an example embodiment, the RX delay bound ageing block 506 may determine an SOP drop time by which a packet must be discarded if it has not already been received by the system-side MAC block 108, after which the RX delay bound ageing block 506 may assert SOP_DELETE signal to the system-side MAC block 108. The SOP_DELETE signal may be asserted to a multiplexer 508 included in the system-side MAC block 508, and may instruct the system-side MAC block 108 to delete and/or not forward the packet.

The RX delay bound ageing block 506 may also determine the forwarding time for each packet, before which the system-side MAC block 108 will not be allowed to forward the packet. The RX delay bound ageing block 506 may, for example, assert an SOP_LAUNCH signal to the multiplexer 508, allowing the system-side MAC block 108 to launch or forward the respective packet to a media dependent interface (MDI) 514; the MDI 514 may include a PHY layer block 102, which may include a media-side PMA 110 and/or a media-side PCS 112, as described with reference to FIG. 1.

The system-side MAC block 108 may also forward packets to the media-side MAC block 106 via the packet processor 502, and may provide an SOP_INDICATE signal 510 to a TX delay bound ageing block 512, which may assert signals to a multiplexer 514. The SOP_INDICATE signal 510, TX delay bound ageing block 512, multiplexer 512, and MDI 516 may correspond to the SOP_INDICATE signal 504, RX delay bound ageing block 506, multiplexer 508, and MDI 514, described above.

Returning to FIG. 2, the MAC blocks 106, 108, may provide link fault signaling 224 to each other. Devices interfaced by the PHY layer device 100 may assert link fault signals to each other via the PHY layer device, such as link fault signals according to the IEEE 802.1AE standard, according to an example embodiment. The link fault signaling 224 may be performed by reconciliation sublayers 226, 228 in the MAC blocks 106, 108; the reconciliation sublayers 226, 228 may send the link fault signals, such as local fault signals or remote fault signals, to each other. Upon reception of a link fault signal from the opposite MAC block 106, 108, a MAC block 106, 108 may stop transmitting data to its respective PHY block 102, 104, and instead forward the link fault signal to its respective PHY block 102, 104. The receiving PHY block 102, 104 may then forward the link fault signal to a device coupled to the PHY layer device 100 on either the media or the system; the PHY layer device may thereby serve as a pass-through device for fault signals.

Figure 6:
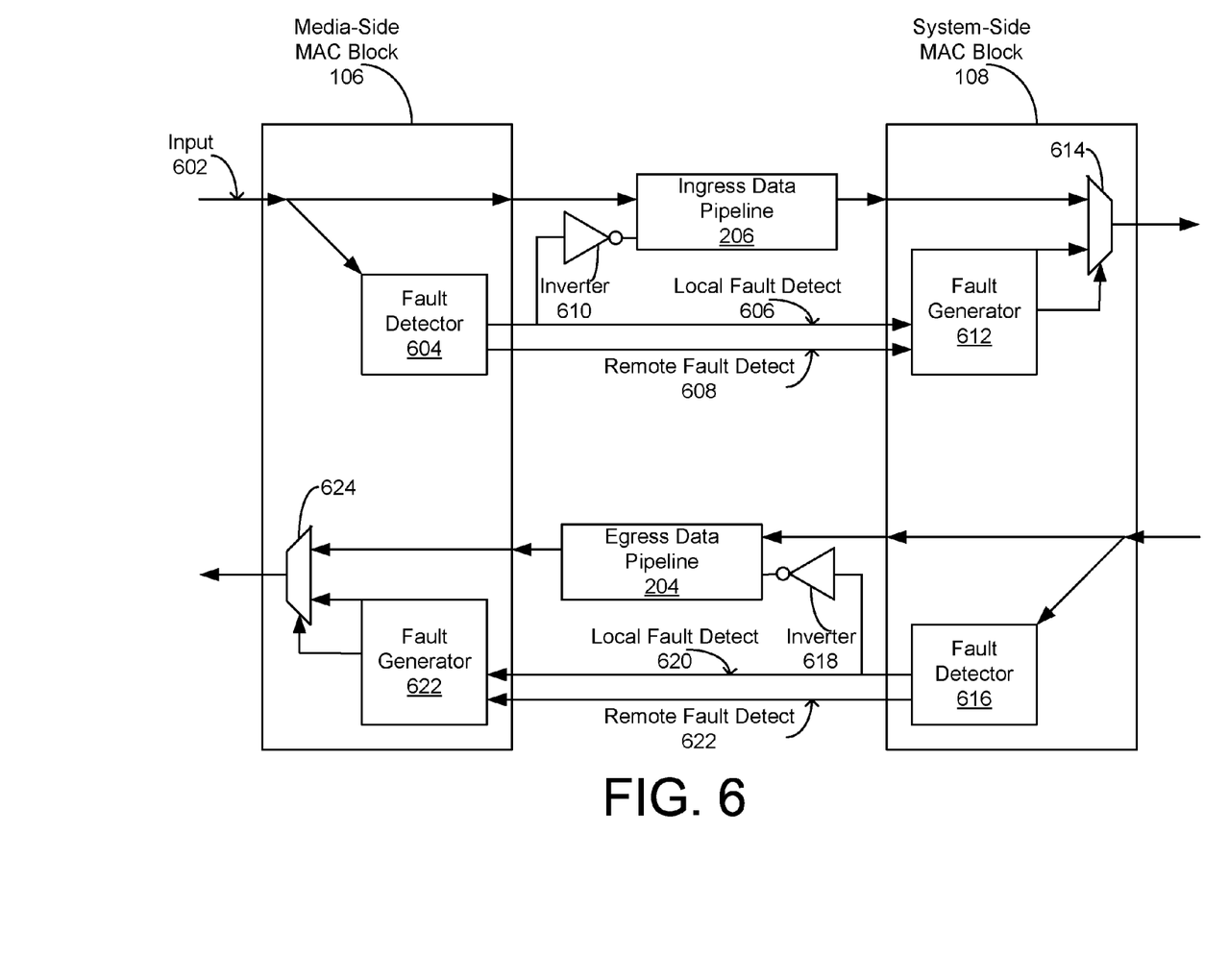
FIG. 6 is a block diagram showing link fault signaling between the two MAC blocks according to an example embodiment.

FIG. 6 is a block diagram showing link fault signaling between the two MAC blocks (such as the media-side MAC block 106 and the system-side MAC block 108) according to an example embodiment. Link fault signals may be predetermined signals or symbols, such as a predetermined series of ones (1s) and zeros (0s) which do not include the fields of a MAC frame recognized by some MAC protocols. MAC blocks 106, 108 may receive link fault signals from their respective PHY blocks 102, 104, regenerate the received link fault signals, and send the regenerated link fault signals to the other MAC block 106, 108. When sending the link fault signals to the other MAC block 106, 108, the MAC blocks 106, 108 may bypass the data paths 204, 206.

In an example embodiment, the media-side MAC block 106 may receive signals, such as either packets or a link fault signal, at an input 602 from its PHY block 102. The media-side MAC block 106 may include a fault detector 604, which may determine whether the signal is a regular packet or a link fault signal. The fault detector 604 may indicate whether the signal is a local fault, a remote fault, or neither, via control lines such as a local fault detect line 606 and/or a remote fault detect line 608. The ingress data pipeline 206 may be controlled by either the local fault detect line 606 and/or the remote fault detect line 608, such as via an inverter 610. If the fault detector 604 determines that the received signal is a regular packet, then the inverter 610, based on a signal received from the local fault detect line 606 and/or the remote fault detect line 608, may allow the ingress data pipeline 206 to process the packet as described above with reference to FIGS. 2 and 3. If the fault detector 604 determines that the received signal is a fault signal, then the inverter 610 may prevent the ingress data pipeline 206 from processing the received signal; the ingress data pipeline 206 may, for example, discard the packet.

The system-side MAC block 108 may include a fault generator 612. The fault generator 612 may determine whether the media-side MAC block 106 received a local fault signal or a remote fault signal by detecting whether the fault detector 604 asserts signals via the local fault detect line 606 or the remote fault detect line 608. If the media-side MAC block 106 did receive a fault signal, the fault generator 612 may regenerate the local fault signal or remote fault signal and provide the regenerated signal to the system-side PHY block 104. The fault generator 612 may, for example, control a multiplexor 614 which receives inputs from both the ingress data pipeline 206 and the fault generator 612. If the fault detector 604 did determine that the media-side MAC block 106 received a link fault signal, then the fault generator 612 may cause the multiplexor 614 to forward the local fault signal or remote fault signal generated by the fault generator 612; if the fault detector 604 determined that the media-side MAC block 106 did not receive a link fault signal, then the fault generator 612 may cause the multiplexor 614 to forward the packet from the ingress data pipeline 206 to the system-side PHY block 104, according to an example embodiment.

Similar functions may be performed for packets or link fault signals received by the system-side MAC block 108 and sent to the media-side MAC block 106.

Returning to FIG. 2, the PHY layer device 100 may perform Energy Efficient Ethernet (EEE) policy assist 230 functions. The PHY layer device 100 may include an egress low power policy engine 232, which may provide signals to a lower power idle support block 234 in the media-side MAC block 106 which causes the media-side PHY block 102 to enter a low power or idle state. The egress low power policy engine 232 may provide the signals to enter the low power or idle state based, for example, on packet error statistics received from the system-side MAC block 108, buffer utilization by the packets, and the content or types of packets destined for the media-side MAC block 106 for forwarding to the media-side PHY block 102. An ingress low power policy engine 236 may also perform similar functions, sending signals to a lower power idle support block 238 included in the system-side MAC block 108 to cause the system-side PHY block 104 to enter a low power or idle state, according to an example embodiment.

Figure 7:
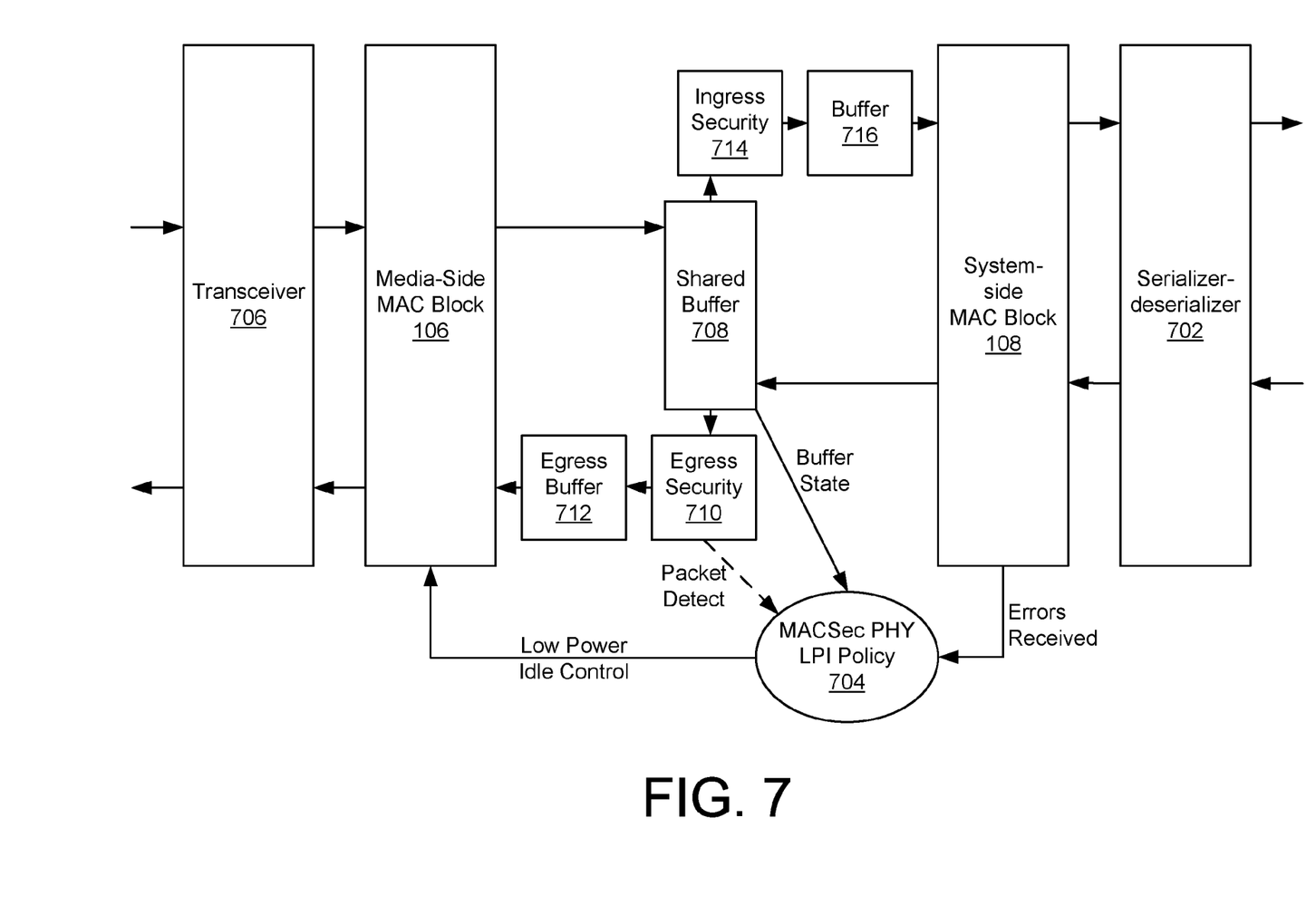
FIG. 7 is a block diagram showing low power idle state control according to an example embodiment.

FIG. 7 is a block diagram showing low power idle state control according to an example embodiment. In an example embodiment, the MAC blocks 106, 108, may allow for more efficient power utilization by the PHY blocks 102, 104. In this example, a serializer-deserializer 702 included in the system-side PHY block 104 may receive and forward packets to the system-side MAC block 108.

The system-side MAC block 108 may determine a number of packets which were erroneously received, such as, for example, by performing cyclic redundancy checks (CRC) on the packets. The system-side MAC block 108 may provide information regarding the packets, such as a number of packets erroneously received, or idle time, to a MACSec PHY low power idle (LPI) policy engine 704. The MACSec PHY LPI policy engine 704 may correspond to the egress low power policy engine 232 shown in FIG. 2, and may be a programmable engine which provides low power and/or idle control to the media-side MAC block 106. The lower power and/or idle control may control a transceiver 706 included in the media-side PHY block 102. The transceiver 706 may listen and transmit along the media, and may drive the signals along the wire or medium. Placing the transceiver 706 into a low power or idle state in which the transceiver 706 may not transmit signals along the media may be useful for saving power, according to an example embodiment.

The MACSec PHY LPI policy 704 may control whether the transceiver 706 enters the low power or idle state based, for example, on a number of packets erroneously received by the system-side MAC block 108, an occupancy rate of a shared buffer 708, and/or types of packets included in an egress security block 710. The system-side MAC block 108 may forward the packets to the shared buffer 708. The shared buffer 708 may store packets received from both the system-side MAC block 108 and the media-side MAC block 106. The shared buffer 708 may provide packet buffering and buffering statistics to the MACSec PHY LPI policy engine 704. The MACSec PHY LPI policy engine 704 may control whether the transceiver 706 enters the LPI state based on whether the number of packets stored in the shared buffer 708 reaches a threshold, which threshold may have been programmed into the MACSec PHY LPI policy engine 704.

The shared buffer 708 may forward the packets to the egress security block 710. The egress security block 710 may provide information to the MACSec PHY LPI policy engine 704 regarding the content or types of packets. The MACSec PHY LPI policy engine 704 may take the transceiver 706 out of the LPI state based on the egress security block 710 indicating that certain types of packets, such as control packets, are to be forwarded.

The egress security block 710 may forward the packets to an egress buffer 712. The egress buffer 712 may store packets destined for forwarding by the media-side MAC block 106.

While not shown in FIG. 7, the PHY layer device 100 may also include a MACSec PHY LPI policy engine (which may correspond to the ingress low power policy engine 236 shown in FIG. 2) for controlling the system-side PHY block 104 entering LPI state based on ingress packets received by the media-side PHY block 102 and media-side MAC block 106, according to an example embodiment.

Figure 8:
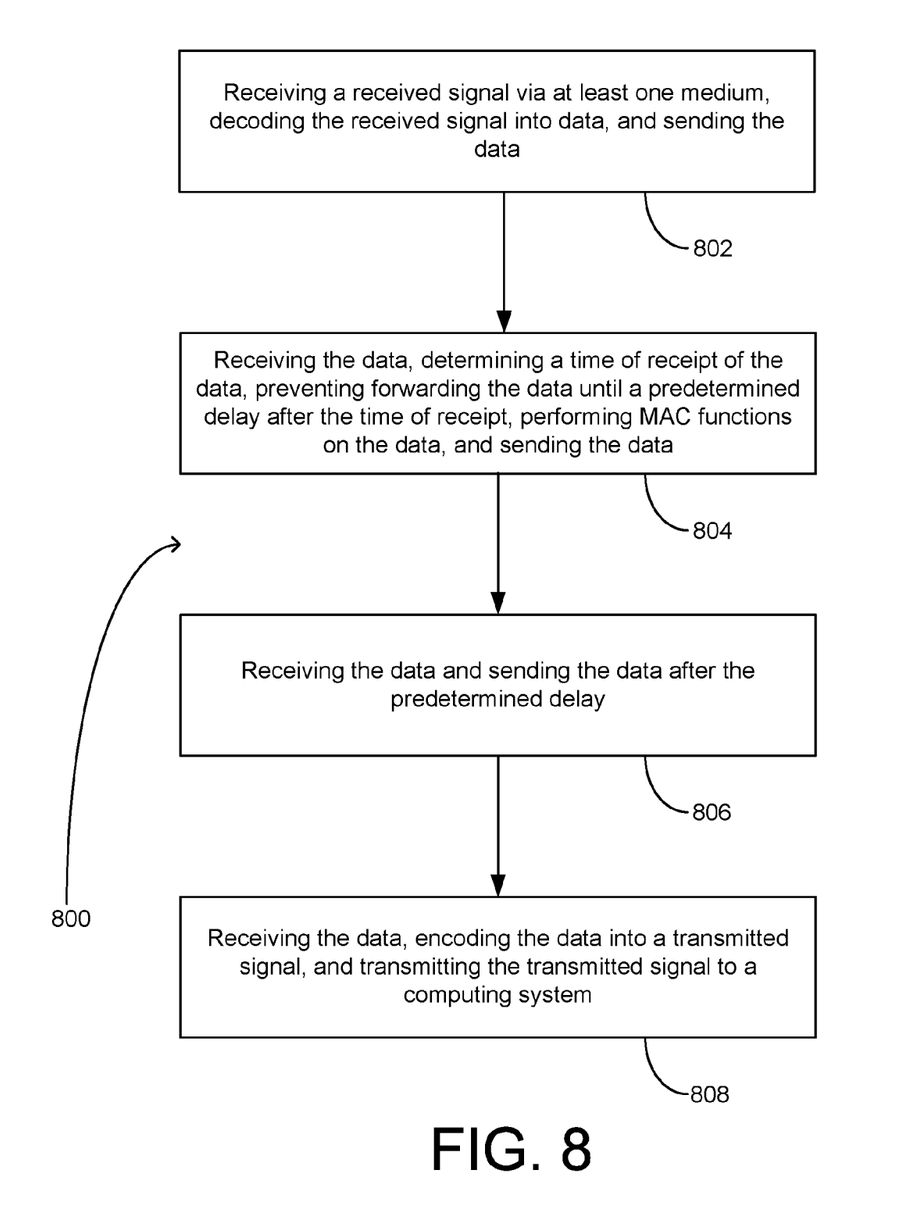
FIG. 8 is a flowchart showing a method according to an example embodiment.

FIG. 8 is a flowchart showing a method 800 according to an example embodiment. In this example, the method 800 may include receiving, at a media-side physical layer (PHY) block, a signal via at least one medium, decoding the received signal into data, and sending the data to a media-side medium access control (MAC) block (802). The method 800 may also include receiving the data, at the media-side MAC block, from the media-side PHY layer block, determining a time of receipt of the data, preventing a system-side MAC block from forwarding the data until a predetermined delay after the time of receipt, performing MAC functions on the data, and sending the data to the system-side MAC block (804). The method 800 may also include receiving, at the system-side MAC block, the data and the control time from the media-side MAC block, and sending the data to a system-side PHY block after the predetermined delay based on signals received from the media-side MAC block (806). The method 800 may also include receiving, at the system-side PHY block, the data from the system-side MAC block, encoding the data into a transmitted signal, and transmitting the transmitted signal to a computing system (808).

According to an example embodiment, the method 800 may include performing carrier sense multiple access collision detection (CSMA-CD) functions on the data.

According to an example embodiment, the method 800 may include encrypting and decrypting the data.

According to an example embodiment, the method 800 may include storing the data in a buffer until the predetermined delay after the time of receipt.

According to an example embodiment, the method 800 may include determining which of the data include flow-control information and sending the data which include flow control information to the system-side MAC block before sending data which do not include flow control information to the system-side MAC block.

According to an example embodiment, the method 800 may include recognizing a media-side link fault signal received from the media-side PHY block and, in response to recognizing the media-side link fault signal, asserting a MAC-level link fault signal to the system-side MAC block, and generating and sending a system-side link fault signal to the system-side PHY block in response to receiving the MAC-level link fault signal.

According to an example embodiment, the method 800 may include controlling whether the media-side PHY block is in a low power state based at least in part on idle statistics received from the system-side MAC block.

According to an example embodiment, the method 800 may include controlling whether the media-side PHY block is in a low power state based at least in part on a number of packets stored in a buffer which stores packets transmitted between the media-side MAC block and the system-side MAC block.

According to an example embodiment, the method 800 may include controlling whether the media-side PHY block is in a low power state based at least in part on a type of at least one packet destined for the media-side PHY block.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. An apparatus comprising:
   a media-side physical layer (PHY) block configured to receive a received signal via at least one medium, decode the received signal into data, and send the data to a media-side medium access control (MAC) block;
   the media-side MAC block configured to receive the data from the media-side PHY layer block, determine a time of receipt of the data, and send the data and a control time to a system-side MAC block;
   the system-side MAC block configured to receive the data and the control time from the media-side MAC block and send the data to a system-side PHY block after a predetermined delay after the time of receipt of the data based on the control time, the predetermined delay being programmable to accommodate different flow control functions performed by the apparatus;
   the system-side PHY block configured to receive the data from the system-side MAC block, encode the data into a transmitted signal, and transmit the transmitted signal to a computing system; and
   a low power policy engine configured to control whether the media-side PHY block is in a low power state based on idle statistics received from the system-side MAC block.

2. The apparatus of claim 1, wherein the media-side PHY block includes:
   a media-side physical medium attachment (PMA) block configured to receive the received signal via the at least one medium and send the received signal to a media-side physical coding sublayer (PCS) block; and
   the media-side PCS block configured to decode the received signal into the data and send the data to the media-side MAC block.

3. The apparatus of claim 2, wherein the system-side PHY block includes:
   a system-side PCS block configured to receive the data from the system-side MAC block, encode the data into the transmitted signal, and send the transmitted signal to a system-side PCS block; and
   the system-side PCS block configured to receive the transmitted signal from the system-side PCS block and transmit the transmitted signal to the computing system.

4. The apparatus of claim 1, wherein the system-side MAC block is configured to receive the data and a control signal from the media-side MAC block and send the data to a system-side PHY block after the predetermined delay after receiving the data based on the control signal.

5. The apparatus of claim 1, wherein the media-side MAC block is configured to perform carrier sense multiple access with collision detection (CSMA-CD) functions on the data.

6. The apparatus of claim 1, wherein the media-side MAC block is configured to encrypt the data, and the system-side MAC block is configured to decrypt the data.

7. The apparatus of claim 1, wherein the system-side MAC block includes a buffer configured to store the data until the predetermined delay after receiving the data.

8. The apparatus of claim 1, wherein the media-side MAC block includes a priority flow controller (PFC) configured to determine which of the data include flow-control information and send the data which include flow control information to the system-side MAC block before sending data which do not include flow control information to the system-side MAC block.

9. The apparatus of claim 1, wherein:
   the media-side MAC block includes a link fault detector configured to recognize a mediaside link fault signal received from the media-side PHY block and, in response to recognizing the media-side link fault signal, assert a MAC-level link fault signal to the system-side MAC block, and
   the system-side MAC block includes a link fault generator configured to generate and send a system-side link fault signal to the system-side PHY block in response to receiving the MAC-level link fault signal.

10. The apparatus of claim 1, wherein:
    the media-side physical layer (PHY) block is programmable for different coding schemes; and
    the predetermined delay is based on the programmed coding scheme.

11. The apparatus of claim 1, wherein the media-side MAC block is configured to send, to the system-side MAC block, a time at which the system-side MAC block should send the data to the system-side PHY block.

12. An apparatus comprising:
    a media-side physical layer (PHY) block configured to receive a received signal via at least one medium, decode the received signal into data, and send the data to a media-side medium access control (MAC) block;
    the media-side MAC block configured to receive the data from the media-side PHY layer block, determine a time of receipt of the data, and send the data and a control time to a system-side MAC block;
    the system-side MAC block configured to receive the data and the control time from the media-side MAC block and send the data to a system-side PHY block after a predetermined delay after the time of receipt of the data based on the control time, the predetermined delay being programmable to accommodate different flow control functions performed by the apparatus;
    the system-side PHY block configured to receive the data from the system-side MAC block, encode the data into a transmitted signal, and transmit the transmitted signal to a computing system; and
    a low power policy engine configured to control whether the media-side PHY block is in a low power state based on a number of packets stored in a buffer which stores packets transmitted between the media-side MAC block and the system-side MAC block.

13. An apparatus comprising:
    a media-side physical layer (PHY) block configured to receive a received signal via at least one medium, decode the received signal into data, and send the data to a media-side medium access control (MAC) block;
    the media-side MAC block configured to receive the data from the media-side PHY layer block, determine a time of receipt of the data, and send the data and a control time to a system-side MAC block;
    the system-side MAC block configured to receive the data and the control time from the media-side MAC block and send the data to a system-side PHY block after a predetermined delay after the time of receipt of the data based on the control time, the predetermined delay being programmable to accommodate different flow control functions performed by the apparatus;

the system-side PHY block configured to receive the data from the system-side MAC block, encode the data into a transmitted signal, and transmit the transmitted signal to a computing system; and a low power policy engine configured to control whether the media-side PHY block is in a low power state based on a type of at least one packet destined for the media-side MAC block.

14. The apparatus of claim 13, wherein:

the media-side physical layer (PHY) block is programmable for different coding schemes; and the predetermined delay is based on the programmed coding scheme.

15. The apparatus of claim 13, wherein the media-side MAC block is configured to send, to the system-side MAC block, a time at which the system-side MAC block should send the data to the system-side PHY block.

16. The apparatus of claim 13, wherein the system-side MAC block is configured to receive the data and a control signal from the media-side MAC block and send the data to a system-side PHY block after the predetermined delay after receiving the data based on the control signal.

17. The apparatus of claim 13, wherein:

the media-side MAC block includes a link fault detector configured to recognize a mediaside link fault signal received from the media-side PHY block and, in response to recognizing the media-side link fault signal, assert a MAC-level link fault signal to the system-side MAC block, and the system-side MAC block includes a link fault generator configured to generate and send a system-side link fault signal to the system-side PHY block in response to receiving the MAC-level link fault signal.

* * * * *